Jan. 11, 1949.  D. W. PETERSON  2,458,634
INDICATING DEVICE
Filed April 16, 1947
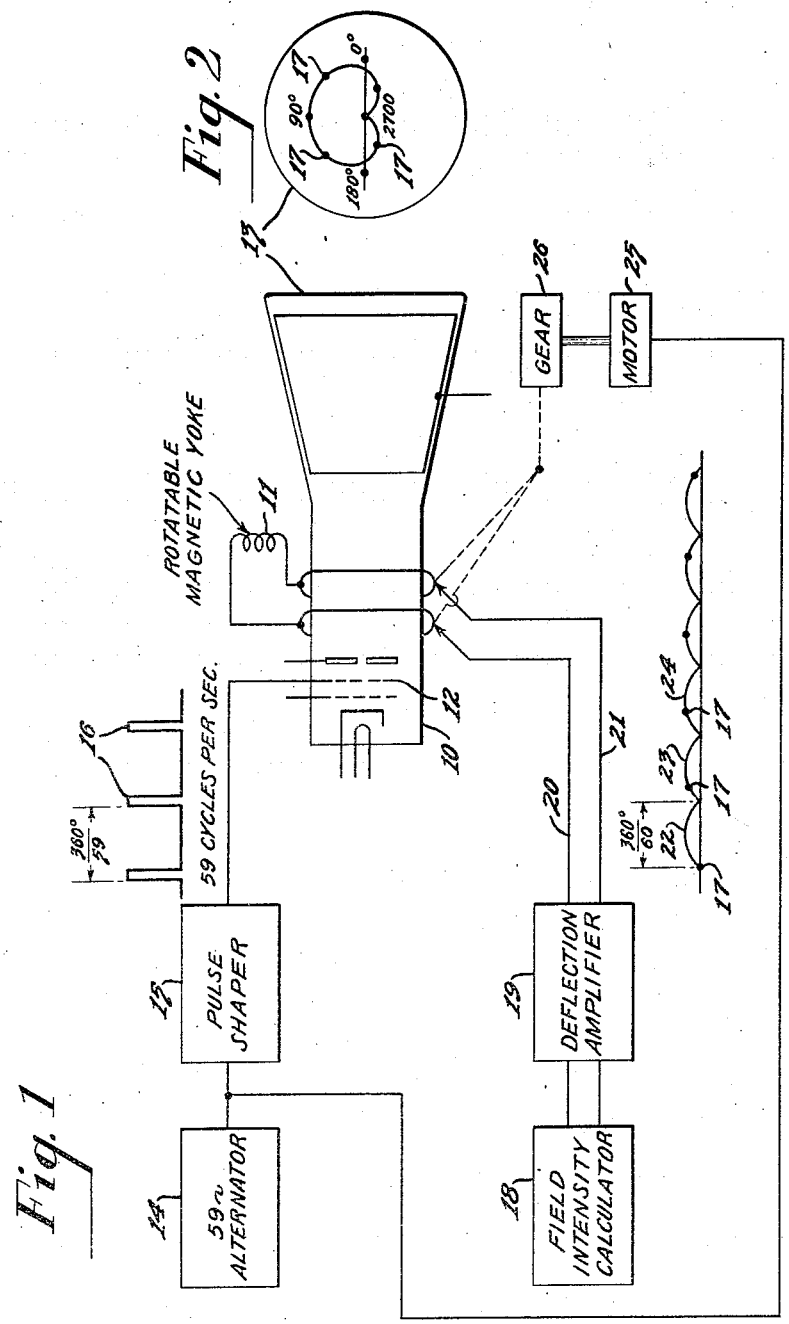
INVENTOR.
Donald W. Peterson
BY
ATTORNEY.

Patented Jan. 11, 1949

2,458,634

UNITED STATES PATENT OFFICE 2,458,634

INDICATING DEVICE

Donald W. Peterson, Princeton, N. J., assignor to Radio Corporation of America, a corporation of Delaware Application April 16, 1947, Serial No. 741,744

7 Claims. (Cl. 315—22)

This invention relates to indicating devices such as are adapted to produce a visual representation of the intensity of an electric field at various points in a predetermined area.

Among the various types of devices available for this purpose are those disclosed by a patent of G. H. Brown, No. 2,337,968, and a copending application of W. C. Morrison, Ser. No. 674,503, filed June 5, 1946.

The present invention has for its principal object the provision of an improved indicating device and method of operation whereby potentials or currents representative of the field intensity at different points may be converted into a visual representation or polar field intensity pattern. Such field intensity representative potentials or currents may be derived from any suitable source such as that disclosed by the aforesaid patent or the aforesaid application. The means by which they are produced forms no part of the present invention and will be illustrated hereinafter merely as a box with an explanatory legend.

The improved indicating device of the present invention includes a cathode ray device which has a long persistence phosphor fluorescent screen such as the RCA P7, and is provided with a rotatable magnetic yoke. To this magnetic yoke is supplied current which varies in accordance with the intensity of the field so that a representation of the field covered is produced at a predetermined rate. To the grid of the cathode ray device is applied at a lower rate pulses which increase the intensity of the ray so that there is produced a series of dots which outline the polar field intensity on the fluorescent screen.

For purposes of illustration, it will be assumed that the magnetic yoke is rotated at the rate of one revolution per second, that the intensifying pulses applied to the grid have a frequency of 59 cycles per second, and that values of current representing a complete scanning of the field are supplied to the magnetic yoke at the rate of sixty per second. Thus there is produced at the rate of one per second a series of bright dots so arranged as to form a polar field intensity pattern of the field under observation, the progression of the dots around the pattern being produced as a result of the difference between the frequencies at which the intensity pulses are applied to the grid and at which the field scanning sets of potentials are applied to the magnetic yoke.

An important object of the invention is the provision of an improved field intensity indicating device which is of simple construction and is readily operable to produce a continuous visual polar field intensity pattern of the field under observation.

The invention will be better understood from the following description considered in connection with the accompanying drawings and its scope is indicated by the appended claims.

Referring to the drawings:

Fig. 1 is a diagrammatic representation of the improved indicating device, elements which are conventional being shown as boxes bearing explanatory legends, and Fig. 2 represents the field intensity pattern produced on the fluorescent screen of the cathode ray tube.

As indicated by Fig. 1, the indicating device includes a cathode ray device 10, which has a rotatable magnetic yoke 11, a control grid 12, a fluorescent screen 13 and the other electrodes usually provided for producing and focusing a cathode ray or electron beam so that it strikes the screen 13 at a point determined by the value of the current passed through the yoke 11.

From an alternating current source shown as an alternator 14, current is supplied to a pulse shaping circuit 15 which may be any one of a number of conventional types designed to produce at its output pulses of the form indicated at 16. These pulses are applied to the grid 12 and function to intensify the ray of the device 10 so that each pulse produces a bright spot 17 on the screen 13.

The location of the spots 17 on the screen 13 is determined (1) by the angular position of the rotatable yoke 11, and (2) by the intensity of the field under observation. The yoke may be rotated by a motor 25 through a speed reducing gear 26.

The sets of potentials representative of the field pattern are derived from a field intensity calculator 18 such as that disclosed by the aforemention patent or copending application. These sets of potentials each representing one complete scanning of the field are amplified by an amplifier 19 and applied to the yoke 11 through the leads 20—21. Immediately below these leads are shown several sets 22, 23 and 24 of these potentials, the values of the potentials being plotted on the vertical axis and the duration of each set being plotted on the horizontal axis.

As previously indicated, these sets are produced at the rate of 60 per second while the intensifying pulses 16 are produced at the rate of 59 per second. From this it follows that the intensity pulse occurs at later times in the successive field scannings so that the bright spots 17 are distributed around the pattern as indicated by Fig. 2. It is, of course, evident that twice as many bright spots may be produced by phase shifting the 59 cycle pulses half a cycle once per second and that other frequencies than those mentioned may be utilized to produce the field intensity pattern on the screen 13.

What the invention provides is an improved indicating device which functions to outline the polar field intensity pattern by a series of bright dots which may be associated with suitable scaling means to determine from instant the exact composition of the field under observation.

I claim as my invention:

1. The combination of a device wherein the intensity of a cathode ray is determined by a potential applied to a control grid and the angular position of said ray on a fluorescent screen is determined by rotation of a magnetic ray deflecting yoke, means for applying to said yoke at a predetermined frequency successive sets of potentials each representative of a complete scanning of an electric field, means for applying to said grid at a different frequency pulses for intensifying said ray, and means for rotating said yoke at a speed such that said ray is intensified at a different period in each of said sets of potentials.

2. The combination of a device wherein the intensity of a cathode ray is determined by a potential applied to a control grid and the angular position of said ray on a fluorescent screen is determined by rotation of a magnetic ray deflecting yoke, means for applying to said yoke at a predetermined frequency successive sets of potentials each representative of a complete scanning of an electric field, and means for applying to said grid at a lower frequency pulses for intensifying said ray.

3. The combination of a device wherein the intensity of a cathode ray is determined by a potential applied to a control grid and the angular position of said ray on a fluorescent screen is determined by rotation of a magnetic ray deflecting yoke, means for applying to said yoke at a predetermined frequency successive sets of potentials each representative of a complete scanning of an electric field, means for applying to said grid at a lower frequency pulses for intensifying said ray, and means for rotating said yoke synchronously with said pulses at a frequency which is low with respect to that of said pulses.

4. The combination of a fluorescent screen, means for applying a beam of electrons to said screen, means for producing a magnetic beam deflecting field by which said beam is rotated at said screen, means for modulating said deflecting field in accordance with the electrical field intensity at different points of a predetermined area, and means for intensifying said beam at points spaced apart along the path of its movement.

5. The combination of a fluorescent screen, means for applying an electron beam to said screen, means for producing a magnetic field by which said beam is made to complete rotational cycles at the rate of one per second, means for modulating said magnetic field in accordance with an electric field intensity at the rate of sixty per second, and means for intensifying said beam at the rate of fifty-nine times per second.

6. The combination of means for producing an electron beam, means for producing a magnetic field by which said beam is made to complete rotational cycles at a first rate of speed, means for modulating said magnetic field in accordance with sets of electric field intensity potentials produced at a second and higher rate of speed, means for intensifying said beam for short time intervals at a rate of speed intermediate said first and second rates of speed, and means for producing a visual pattern of the points at which said beam is intensified.

7. The combination of a fluorescent screen, means for applying an electron beam to said screen, means for intensifying said beam at a first predetermined frequency, means for producing a magnetic field by which said beam is rotated at a second predetermined frequency, and means for modulating said field in accordance with an electrical field intensity at a third predetermined frequency.

DONALD W. PETERSON.

REFERENCES CITED

The following references are of record in the file of this patent:

UNITED STATES PATENTS

| Number | Name | Date |
| --- | --- | --- |
| 2,121,359 | Luck et al. | June 21, 1938 |
| 2,263,377 | Busignies et al. | Nov. 18, 1941 |
| 2,265,848 | Lewis | Dec. 9, 1941 |
| 2,337,968 | Brown | Dec. 28, 1943 |
| 2,389,995 | Packer | Nov. 27, 1945 |
| 2,403,278 | Hershberger | July 2, 1946 |